United States Patent
Rioul et al.

(10) Patent No.: US 11,210,367 B2
(45) Date of Patent: Dec. 28, 2021

(54) METHODS AND DEVICES FOR ESTIMATING SECRET VALUES

(71) Applicant: INSTITUT MINES-TELECOM, Paris (FR)

(72) Inventors: Olivier Rioul, Ris Orangis (FR); Sylvain Guilley, Paris (FR)

(73) Assignee: INSTITUT MINES-TELECOM, Paris (FR)

( * ) Notice: Subject to any disclaimer, the term of this patent is extended or adjusted under 35 U.S.C. 154(b) by 324 days.

(21) Appl. No.: 16/060,947

(22) PCT Filed: Dec. 8, 2016

(86) PCT No.: PCT/EP2016/080324
§ 371 (c)(1),
(2) Date: Jun. 10, 2018

(87) PCT Pub. No.: WO2017/097930
PCT Pub. Date: Jun. 15, 2017

(65) Prior Publication Data
US 2018/0365195 A1    Dec. 20, 2018

(30) Foreign Application Priority Data

Dec. 11, 2015  (EP) .................................... 15306992

(51) Int. Cl.
*G06F 17/18* (2006.01)
*H04L 9/00* (2006.01)
(Continued)

(52) U.S. Cl.
CPC .............. *G06F 17/18* (2013.01); *G06F 17/16* (2013.01); *G06F 21/556* (2013.01); *G06N 7/00* (2013.01); *H04L 9/002* (2013.01); *H04L 9/36* (2013.01)

(58) Field of Classification Search
CPC ........ G06F 17/16; G06F 17/18; G06F 21/556; G06N 7/00; H04L 9/002; H04L 9/36
See application file for complete search history.

(56) References Cited

U.S. PATENT DOCUMENTS 8,386,800 B2 *  2/2013  Kocher ................. G06F 21/602
                                                       713/189
10,025,926 B2 *  7/2018  Walters .................... H04L 9/003

OTHER PUBLICATIONS

Kocher, et al., "Differential Power Analysis", Advances in Cryptology—CRYPTO, vol. 1666 of the Series Lecture Notes in Computer Science, pp. 388-397, 1990.
(Continued)

*Primary Examiner* — Elias Desta
(74) *Attorney, Agent, or Firm* — BakerHostetler (57) ABSTRACT

A secret value estimation device is provided for determining an estimate of at least one secret value used by at least one cryptographic mechanism implemented in a cryptographic system from a statistical distribution of a set of multivariate leakage traces determined by a leakage traces statistical distribution unit. Each leakage trace being a vector comprises a plurality of random values, the number of said random values being an integer number superior or equal to 1, the statistical distribution being a function of parametric linear combinations of a set of leakage model basis vectors representing a multivariate leakage model, the number of basis vectors being an integer number superior or equal to 1, and the linear combinations being defined by a matrix of real values.

12 Claims, 3 Drawing Sheets

(51) Int. Cl.
  *G06F 17/16* (2006.01)
  *G06F 21/55* (2013.01)
  *G06N 7/00* (2006.01)
  *H04L 9/36* (2006.01)

(56) References Cited

OTHER PUBLICATIONS

Berkes, "Hardware attacks on Cryptographic Devices", Implementation attacks on Embedded Systems and Other Portable Hardware, University of Waterloo Prepared for ECE 628.2006.

Chari, et al., "Towards Sound Approaches to Counteract Power-Analysis Attacks", Advances in Cryptology—CRYPTO, vol. 1666 of the Series Lecture Notes in Computer Science, pp. 398-412, 1999.

Chari, et al., "Template Attacks", Cryptographic Hardware and Embedded Systems (CHES), vol. 2523 of the Series Lecture Notes in Computer Science, pp. 13-28, 2003.

Coron, et al., "On Boolean and Arithmetic Masking against Differential Power Analysis", Cryptographic Hardware and Embedded Systems (CHES), vol. 1965 of the Series Lecture Notes in Computer Science, pp. 231-237, 2000.

Schindler, "A Stochastic Model for Differential Side Channel Cryptanalysis", Cryptographic Hardware and Embedded Systems (CHES), vol. 3659 of the Series Lecture Notes in Computer Science, pp. 30-46, 2005.

Heuser, "Good Is Not Good Enough—deriving Optimal Distinguishers from Communication Theory", Cryptographic Hardware and Embedded Systems (CHES), vol. 8731 of the Series Lecture Notes in Computer Science, pp. 55-74, 2014.

Bruneau, et al., "Less is More—Dimensionality Reduction from a Theoretical Perspective" Cryptographic Hardware and Embedded Systems (CHES), vol. 9293 of the Series Lecture Notes in Computer Science, 2015.

Brier, et al., "Correlation Power Analysis with a Leakage Model" Cryptographic Hardware and Embedded Systems (CHES), vol. 3156 of the Series Lecture Notes in Computer Science, pp. 16-29, 2004.

Hajra, et al., "Pushing the Limit of Non-Profiling DPA using Multivariate Leakage Mode", International Association for Cryptologic Research, vol. 20131217:153917,Dec. 15, 2013 (Dec. 15, 2013), pp. 1-9, XP061015237.

Hajra, et al., Reaching the Limit of Nonprofiling DPA, IEEE Transactions on Computer Aided Design of Integrated Circuits and Systems, IEEE Service Center, Piscataway, NJ, US, vol. 34, No. 6, Jun. 1, 2015 (Jun. 1, 2015), pp. 915-927, XP011581923.

Bruneau, et al., "Less is More", Sep. 1, 2015 (Sep. 1, 2015), Correct System Design; [Lecture Notes in Computer Science; Lect.Notes Computer], Springer International Publishing, Cham, pp. 22-41, XP047319375.

\* cited by examiner

METHODS AND DEVICES FOR ESTIMATING SECRET VALUES

CROSS-REFERENCE TO RELATED APPLICATIONS

This application is a National Stage of International patent application PCT/EP2016/080324, filed on Dec. 8, 2016, which claims priority to foreign European patent application No. EP 15306992.7, filed on Dec. 11, 2015, the disclosures of which are incorporated by reference in their entirety.

FIELD OF THE INVENTION

The invention generally relates to cryptographic systems and in particular to methods and devices for estimating secret values used in cryptographic mechanisms.

BACKGROUND

Cryptographic mechanisms are used in many fields to ensure security, authentication, protection and privacy of data during their storage and/or their transmission. With the rapid development and advances in computer sciences and computer hardware technologies, cryptographic low cost, fast and small devices have became essential items deployed for different applications and several systems such as communication systems and data processing systems.

Cryptographic mechanisms generally employ cryptographic keys in order to generate ciphered data (also referred to as "ciphertext") from original data (also referred to as "plaintext") to prevent a hacker from recovering the original data, while access to the input data requires access to the cryptographic keys used to encrypt the original data through a decryption mechanism.

Most of the improvements related to cryptographic algorithms aim at enhancing security against attacks on the data conveyed through a communication system rather than against attacks on the physical properties of the implementation of the cryptographic mechanisms. However, physical attacks such as side-channel attacks, fault attacks and physical tampering become a growing threat. An attack on the physical implementation of cryptographic algorithms can have a major impact on data security (e.g. loss of privacy, loss of protection and security, etc.).

Exemplary hardware attacks on hardware implementations of cryptographic mechanisms comprise side-channel attacks. Such side-channel attacks have been disclosed in the article:

P. Kocher, J. Jaffe, and B. Jun. Differential Power Analysis. Advances in Cryptology-CRYPTO. Volume 1666 of the Series Lecture Notes in Computer Science. Pages 388-397. 1990".

"J. Berkes. Hardware attacks on Cryptographic Devices, Implementation attacks on Embedded Systems and Other Portable Hardware. University of Waterloo Prepared for ECE 628.2006".

A side-channel refers to any physically leaked information that could be used by an attacker as an additional source of knowledge of the physical implementation of cryptographic mechanisms. Examples of side-channels include power consumption, time delays, electromagnetic radiations, sound and infrared radiations. This leaked information may statistically reveal characteristics on the cryptographic mechanisms running on the attacked device. For example, attackers having a physical access to attacked devices, may measure the time required by a cryptographic device to run secret key computational operations, or monitor the power consumption over time related to the cryptographic processing. Having access to such physical observables that depend on the internal state of attacked devices may disclose information about the instructions being executed and therefore compromise sensitive secret parameters of the underlying cryptosystem.

Conventionally, side-channel attacks may be countered by providing cryptographic mechanisms that run in a constant time or developing cryptographic programs that operate under a constant program flow, regardless of the underlying secured data. These techniques allow mitigating side-channel attacks. However, their practical implementation is not feasible in applications where the hardware resources (storage space, processing capabilities) are limited due for example to cost or size considerations. Besides, the value of the data manipulated by the algorithm can also leak. Therefore, other side-channel mitigation solutions have been disclosed in:

"S. Chari, C. S. Jutla, J. R. Rao, and P. Rohatgi. Towards Sound Approaches to Counteract Power-Analysis Attacks. Advances in Cryptology-CRYPTO. Volume 1666 of the Series Lecture Notes in Computer Science. Pages 398-412. 1999".

"S. Chari, J. R. Rao, and P. Rohatgi. Template Attacks. Cryptographic Hardware and Embedded Systems (CHES). Volume 2523 of the Series Lecture Notes in Computer Science. Pages 13-28. 2003".

"J-S. Coron and L. Goubin. On Boolean and Arithmetic Masking against Differential Power Analysis. Cryptographic Hardware and Embedded Systems (CHES). Volume 1965 of the Series Lecture Notes in Computer Science. Pages 231-237. 2000".

These solutions use in their essence randomization techniques such as secret splitting or masking schemes aiming at adding a protection layer to the cryptographic mechanisms through the use of random unknown numbers that prevent unintended receivers or attackers from predicting secret values from leaked information. Masking schemes are efficient in scenarios where the attacker exploits physical leaked information observed in one instant. However, it was demonstrated that some attacks, which are based on multiple leaked information in multiple instants (such as high-order differential analysis), randomization techniques fail to inhibit attackers to successfully recover desired secret values (in "P. C. Kocher, J. Jaffe, and B. Jun. Differential Power Analysis. Advances in Cryptology-CRYPTO. Volume 1666 of the Series Lecture Notes in Computer Science. Pages 388-297. 1999").

The target of an attacker with respect to a cryptographic system may depend on the application. For example, an attacker may seek for learning secret parameters such as the key used to encrypt or decrypt data, for exploiting leaked information of the attacked system without learning private parameters, for damaging the normal serviceability of the system, etc. In the past years, such attacks were empirical. As a result, if they succeed sometimes in recovering the desired secret parameters, for instance the cryptographic keys, they are not as efficient as possible. Other side-channel attacks exist including:

template attacks as disclosed in "S. Chari, J. R. Rao, and P. Rohastgi. Template Attacks. Cryptographic Hardware and Embedded Systems (CHES). Volume 2523 of the Series Lecture Notes in Computer Science. Pages 13-28. 2002.", and stochastic attacks disclosed in the article "W. Schindler, K. Lemke, and C. Paar. A Stochastic Model for Differential Side Channel Cryptanalysis. Cryptographic Hardware and Embedded Systems (CHES). Volume 3659 of the Series Lecture Notes in Computer Science. Pages 30-46. 2005".

Template and stochastic attacks comprise two phases: a profiling phase and an online secret value extraction phase. During the profiling phase, an attacker equipped with a device identical to the attacked device tries to characterize the leakage model of a physical observable parameter of the attacked device. The attacker, during the second phase, attempts to recover desired secret value(s) using the leakage model and measurements acquired during operation of the attacked device by seeking over all possible secret values the value that optimizes a given performance criterion. In the context of private key recovery, the performance criterion can be the maximization of the probability of success rate which reduces, in the case of uniformly distributed cryptographic key values, to a Maximum Likelihood (ML) optimization problem solved using a distinguisher. ML distinguishers are disclosed in the article "A. Heuser, O. Rioul, and S. Guilley. Good Is Not Good Enough-deriving Optimal Distinguishers from Communication Theory. Cryptographic Hardware and Embedded Systems (CHES). Volume 8731 of the Series Lecture Notes in Computer Science. Pages 55-74. 2014". They designate the optimal distinguishers for the criterion based on the maximization of the probability of success rate in recovering the secret key.

The leakage model characterizes the link between the leakage corresponding to the observable measurements (also referred to as "traces" or "leakage traces") and a theoretical model. A leakage model is a probabilistic model used to characterize the statistical distribution of the leakage traces given any secret key hypothesis. Traces modeled by a leakage model can be considered as originating from a simulation of this leakage model. Three modeling parameters are known that impact the rate of success for the recovery of secret values:

the dimensionality D of the leakage traces (also referred to as "dimensionality of the leakage" or "leakage dimensionality"), the dimensionality S of the theoretical leakage model (also referred to as "leakage model dimensionality"), and the coefficients of a real matrix D×S matrix a modeling the link between the theoretical model and the leakage traces.

When the dimensionality of the leakage is superior or equal to 1, the leakage is referred to as a "multivariate leakage". This case characterizes side-channel leakage which can be measured by an analogue-to-digital converters, such as oscilloscopes, that acquire multiple samples at a fast rate (e.g., 10 G sample/s where the leakage of a synchronous device is produced at frequency of say 100 MHz, hence traces of 100 samples). Thus, it is frequent that the leakage dimensionality is much greater than 1. Similarly, when the dimensionality of the theoretical model is superior or equal to 1, the model is referred to as a "multivariate model". In contrast a "Monovariate" leakage or model refers to a leakage or model of unitary dimensionality, D=1 (respectively a model of unitary dimensionality S=1). A multivariate leakage trace designates any linear combination of theoretical models to which is added a noise component modeling the environment in which the attacked device is housed. Moreover, the coefficients of the matrix a determining the link between the measurements and the theoretical model may be wholly or partially unknown in which case the model is said to be 'parametric'. Attacks in such cases, also called 'stochastic' attacks, comprise a model profiling step prior to extraction of the secret value in order to estimate the missing coefficients of the leakage model.

There exist several existing works on optimal ML distinguishers in presence of Gaussian noise for linear and affine leakage models and referring respectively to a dimensionality S equal to 1 or 2. An approach for a multivariate leakage and a linear leakage model of known coefficients has been addressed in the article "N. Bruneau, S. Guilley, A. Heuser, D. Marion, and O. Rioul. Less is More-Dimensionality Reduction from a Theoretical Perspective. Cryptographic Hardware and Embedded Systems (CHES). Volume 9293 of the Series Lecture Notes in Computer Science. 2015". Specifically, the affine parametric model with a monovariate leakage was disclosed in:

"E. Brier, C. Clavier, and F. Olivier. Correlation Power Analysis with a Leakage Model. Cryptographic Hardware and Embedded Systems (CHES). Volume 3156 of the Series Lecture Notes in Computer Science. Pages 16-29. 2004";

"A. Heuser, O. Rioul, and S. Guilley. Good Is Not Good Enough—deriving Optimal Distinguishers from Communication Theory. Cryptographic Hardware and Embedded Systems (CHES). Volume 8731 of the Series Lecture Notes in Computer Science. Pages 55-74. 2014".

Estimation of secret values used in cryptographic implementations from side-channel leaked information may be performed to estimate the vulnerability of a cryptographic implementation against the most powerful attacks. Existing estimation techniques either consider monovariate leakages or perform a dimensionality reduction on multivariate leakages followed by a suboptimal distinguisher uncorrelated from the dimensionality reduction technique. Both methods are suboptimal since they do not jointly consider realistic scenarios where the leakages and the models are multivariate. Further, the successful recovery of secret values and hence the degree of security of a cryptographic device against side-channel attacks depends on the leakage model characterization as well as on the used secret value estimation algorithms. However, there remains a need for improved secret value estimation methods and systems given side-channel leakages that implement optimal schemes for recovering secret values in the presence of multivariate leakages and multivariate parametric models.

SUMMARY OF THE INVENTION

In order to address these and other problems, there is provided a secret value estimation device to determine an estimate of at least one secret value used by at least one masked cryptographic mechanism implemented by a cryptographic system (also referred as "cryptosystem"). According to one aspect of the invention, the estimate of the secret value is determined from a statistical distribution of a set of multivariate leakage traces, the statistical distribution of a set of multivariate leakage traces being a function of parametric linear combinations of a multivariate parametric leakage model being represented by a set of leakage model basis vectors and the number of the leakage model basis vectors being an integer number superior or equal to 1, and the parametric linear combinations being defined by a matrix of real values.

The estimation device may comprise an analysis unit configured to determine a dimensionality of the leakage traces, and deliver a measurements series matrix from the leaked information.

The estimation device may further comprise a processing unit configured to determine a leakage model and its dimensionality, to determine, using a distinguisher, estimate(s) of at least one secret value used in the masked cryptographic mechanism according to a performance criterion, and quantify the security level and vulnerability of the analyzed cryptosystem by determining a security performance metric with respect to one or more side-channel attacks.

In certain embodiments, the analysis unit may be configured to determine the dimensionality of the leakage traces depending on the noise correlation within each trace.

In certain embodiments, the processing unit may be configured to determine an estimate of a cryptographic secret key used in the cryptographic mechanisms to encrypt/decrypt data according to the maximization of the probability of successful key recovery criterion. The cryptographic secret key may be composed of several bits with similar or different leakage properties.

The matrix of real values may comprise at least one unknown value, the device being further configured to determine an estimate of the at least one unknown value of the matrix of real values defining the parametric linear combinations. In particular, the processing unit may implement an expectation maximization algorithm to jointly determine estimates of the unknown coefficients of a parametric multivariate leakage model and an estimate of a cryptographic secret key.

In certain embodiments, the processing unit may be configured to quantify the security level of the analyzed cryptosystem by determining the success rate or the rate of successful recovery of secret value(s) used in the cryptographic mechanisms.

There is further provided a method of estimating at least one secret value used by at least one cryptographic mechanism from a statistical distribution of a set of multivariate leakage traces, each leakage trace being a vector comprising a plurality of random values, the number of random values being an integer number superior or equal to 1, the leakage traces statistical distribution being a function of parametric linear combinations of a set of leakage model basis vectors representing a multivariate leakage model, the number of the leakage model basis vectors being an integer number superior or equal to 1, and the linear combinations being defined by a matrix of real values.

The estimation method may comprise determining a number of leakage traces, determining a dimensionality of these traces, determining a leakage model and its dimensionality and computing an estimate of at least one secret value according to a performance criterion using an estimation algorithm.

Advantageously, the various embodiments of the invention enable analyzing multivariate side-channel leakages and handling multivariate leakage models of at least partially unknown parameters.

Advantageously, the various embodiments of the invention provide optimal secret value(s) calculation methods or distinguishers that depend only on a multivariate leakage model and the probability distribution of the noise altering the original data or signals and affecting the environment in which is housed the analyzed cryptosystem.

Advantageously, the various embodiments of the invention allow manipulating in parallel several sensitive bits of secret cryptographic key with similar or different leakage properties.

Advantageously, certain embodiments of the invention allow optimizing the signal-to-noise ratio which is an indicative metric of the impact of the noise level on the concentration of the signal and therefore optimizing the success rate for a given number of leakage traces.

Advantageously, certain embodiments of the invention allow further achieving a signal-to-noise ratio greater than any signal-to-noise ratio value obtained by considering monovariate leakage traces, for the same number of leakage traces and same leakage model.

Advantageously, certain embodiments of the invention based on batch processing allow further faster and parallel computations for secret value(s) estimation.

Further advantages of the present invention will become clear to the skilled person upon examination of the drawings and detailed description. It is intended that any additional advantages be incorporated herein.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention provide methods and devices for estimating at least one secret value used in a cryptographic mechanism implemented in a cryptographic system from leakage information or side-channel information. The cryptosystem is associated with statistical distribution of multivariate leakage traces being function of noisy parametric linear combinations of a set of multivariate leakage model basis vectors, said linear combinations being represented by a matrix of real values, said real values being wholly known or comprising at least one unknown value.

Figure 1:
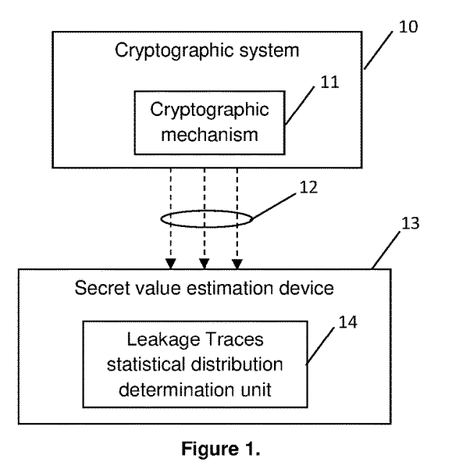
FIG. 1 is a schematic diagram of an implementation of a secret value estimation device.

With reference to FIG. 1, an example of the implementation of a secret value estimation device 13 is illustrated. The secret value estimation device 13 is implemented to evaluate the vulnerability of a cryptographic system 10 implementing one or more cryptographic mechanisms 11 against one or more side-channel attacks by determining estimation of secret value(s) used in cryptographic mechanism(s) 11 given the side-channel information or leakage information 12 and a statistical distribution of a set of multivariate leakage traces determined by a leakage traces statistical distribution determination unit 14.

Secret value estimation methods and devices according to certain embodiments of the invention may be implemented in the phase of designing or developing a cryptographic system 10 or estimating the security of manufactured embedded systems in a certification process. The cryptographic system 10 may be any type of system or device using a cryptographic mechanism 11 or algorithm to protect data, whatever the application, such as communication and data processing applications. For example, the cryptographic system 10 may be user equipment (e.g. smartphone), a relay station or a base station implemented in a wireless network (such as a cellular or adhoc networks), the cryptographic system 10 using cryptographic mechanism(s) 11 in order to secure the data (e.g. signals) transmitted over an unsecure communication channel. In another example, the cryptographic system 10 may be part of an information processing system (such as a computer system, a database, an online sale system or a financial systems) implementing a cryptographic mechanism 11 for securing data exchanged or stored in the system (for example personal data such as financial account numbers and social security numbers).

Each cryptographic mechanism implemented in the cryptosystem is associated with an indicator of successful recovery of secret values and a degree of security of the secret value against side-channel attacks. Such parameters depend on the leakage model corresponding to a theoretical model used to characterize the leakage traces, as well as on the calculation algorithms used to calculate the secret values, also referred to as distinguishers. According to the various embodiments of the invention, the determination of secret value(s) is optimally performed by jointly calculating estimates of the unknown parameters of linear combinations of basis vectors of a multivariate leakage model and determining an estimate of the cryptographic secret value(s). The parameters of the linear combinations of the basis vectors of the leakage model correspond to the coefficients of the matrix a determining the link between the leakage traces and the theoretical leakage model.

Figure 2:
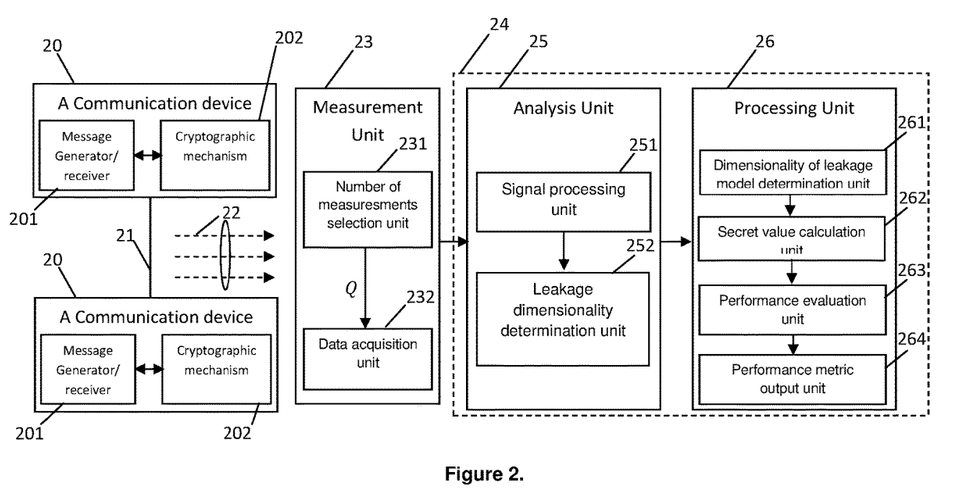
FIG. 2 is a block diagram illustrating a detailed structure of a secret value estimation device according to an exemplary embodiment of the present invention.

Referring to FIG. 2, there is shown an exemplary implementation of the secret value estimation methods and devices for a communication device 20 (representing the cryptosystem) implementing a hardware cryptographic mechanism and used in a communication system.

The following description will be made with reference to a cryptographic mechanism implementing a cryptographic secret key for encryption/decryption for illustration purpose only. However, the skilled person will readily understand that other cryptographic mechanisms may be used according to which the secret value is different from the private cryptographic key.

The communication device 20 may be a fixed device, such as a laptop computer operating in a wired communication system, or a mobile device, such as mobile phones operational in wireless environments. The communication device 20 may comprise for example:
  A Message generator/receiver unit 201 configured to generate or receive an input data (for example a signal or a message);
  A Cryptographic mechanism unit 202 configured to encrypt or decrypt a generated or received data.

The communication device 20 may be configured to communicate encrypted data with at least another communication device 20 through a communication interface 21. The communication interface 21 may be for example a wired link, a wireless propagation medium or an optical connection.

The side-channel 22 schematically represents the information leaked from the communication device 20. Leaked information may be for example the power consumption of the communication device 20 while running the cryptographic mechanism 202, the processing time required to perform a given cryptographic operations, the electromagnetic emanations, sound or infrared radiations emitted by the communication device 20. This leaked information takes, in general, the form of a series of values (side-channel traces).

It may statistically reveal certain characteristics related to the cryptographic mechanisms 202 running on the communication device 20.

The side-channel leaked information 22 may be intercepted by a measurement unit 23 configured to collect a set of trace measurements with respect to one or many side-channels leaked from the communication device 20. The measurement unit 23 may comprise:
  A number of measurements selection unit 231 configured to determine the number Q of measurements to be collected;
  A data acquisition unit 232 configured to collect samples of traces from leaked information from the communication device 20. The data acquisition unit 232 may be for example high speed equipment such as a modern digital oscilloscope with high speed analog-to-digital captures or any instrument equipped with a set of sensors (passive or active) such as voltage, current, power, electromagnetic probes, or temperature or acoustic sensors configured to detect physical properties of the communication device 20 from the leaked information 22.

In certain embodiments, the number of measurements selection unit 231 may be configured to determine the number of the acquired leakage traces depending on the signal-to-noise ratio to take into account the level of the noise.

In other embodiments, the number of measurements selection unit 231 may be configured to determine the number of the acquired leakage traces depending on a target performance metric according to a performance criterion.

The collected traces may be then fed into a secret value estimation device 24 comprising an analysis unit 25 and a processing unit 26. The analysis unit 25 may be configured to analyze the acquired set of data and deliver a measurements series matrix X. The analysis unit 25 may comprise:
  A signal processing unit 251 configured to remove alignment errors, highlight signals and/or reduce the noise level.
  A leakage dimensionality determination unit 252 configured to determine a value of the dimensionality D of the multivariate leakage and generate a measurements series matrix X of dimension D×Q.

The measurements series matrix delivered by the analysis unit 25 is then fed into a processing unit 26. The processing unit 26 is configured to evaluate the vulnerability of the communication device 20 by determining estimate(s) of at least one secret value used in the cryptographic mechanism 202 from the leaked information via the side-channel 22. The processing unit 26 may comprise:
  A dimensionality of leakage model determination unit 261 configured to deliver a value S of the dimensionality of a leakage model;
  A secret value calculation unit 262 configured to generate estimate(s) of desired secret value(s).
  A performance evaluation unit 263 configured to calculate a security performance metric PM to measure the effectiveness of the secret value estimation unit 262 given its output.
  A performance metric output unit 264 configured to output the estimated secret value and/or the security performance metric or any metric indicative of the security level of the analyzed communication device 20.

In certain embodiments, the analysis unit 25 may be configured to determine the dimensionality of the leakage traces depending on the noise correlation within each leakage trace.

In certain embodiments, the processing unit 26 may be configured to determine an estimate of a cryptographic secret key implemented in the cryptographic mechanisms 202 to encrypt/decrypt data according to the maximization of the probability of success key recovery criterion. The cryptographic secret key may be composed of several bits with similar or different leakage properties. In such embodiments, the processing unit 26 may be configured to quantify the security level of the cryptosystem 20 by determining the success rate or the rate of successful recovery of the secret key used in the cryptographic mechanisms 202 implemented by the communication device 20. Accordingly, in embodiments where the leakage model is parametric, i.e. the coefficients of the linear combinations of the basis vectors of the leakage model are at least partially unknown; the secret value calculation unit 262 may be configured to jointly determine estimates of the unknown coefficients of the parametric leakage model and an estimate of the cryptographic secret key. In contrast to separate estimation of the unknown coefficients of the leakage coefficients of the leakage model in a model profiling step prior to extraction of the secret value, considered for example in template and stochastic side-channel attacks, joint estimation refers here to simultaneously determine estimates of the missing leakage model coefficients and an estimate of the secret key. The secret value calculation unit 262 may implement an expectation maximization algorithm to jointly calculate these estimates.

When applied to evaluate the success recovery of a cryptographic secret key used in the communication device 20 to encrypt or/and decrypt data, the methods and devices according to the embodiments of the invention may provide an evaluation of the vulnerability of the used encryption/decryption secret key with respect to one or more side-channel attacks.

Figure 3:
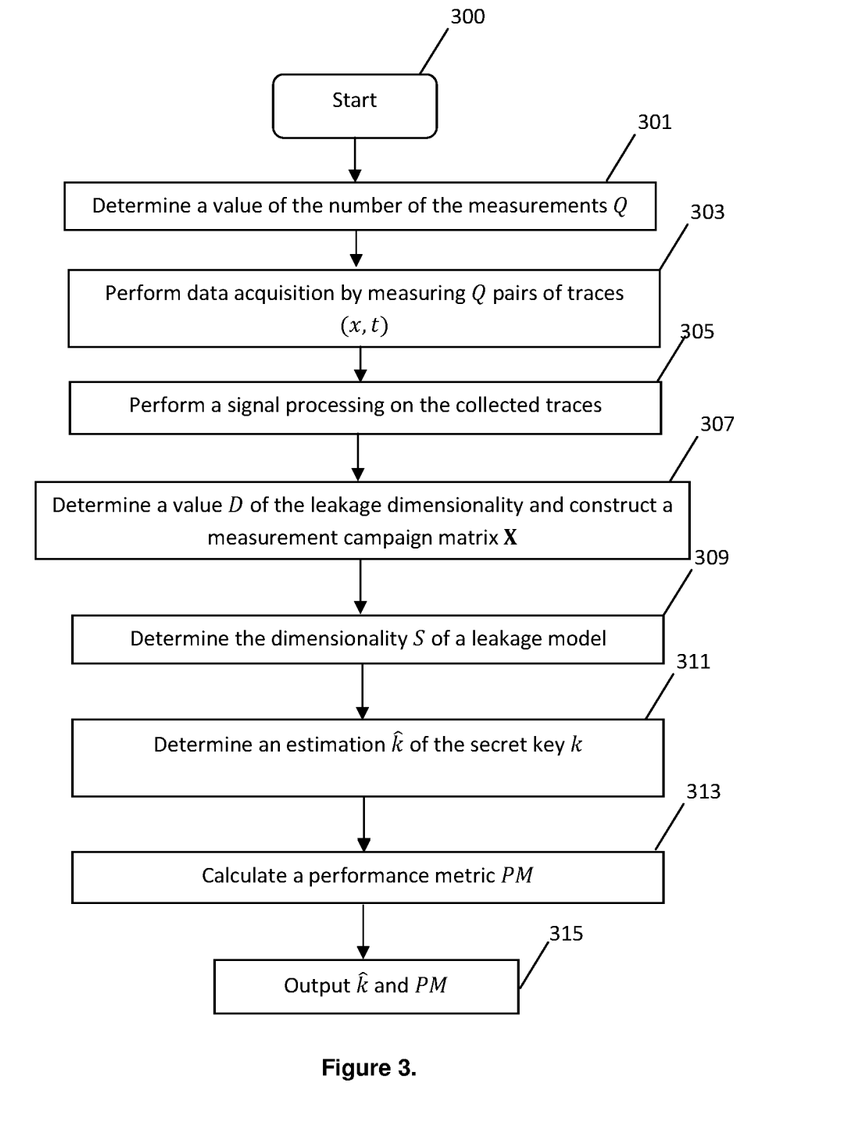
FIG. 3 is a flowchart depicting a method of secret value estimation given multivariate leakage and model according to an exemplary embodiment of the present invention.

FIG. 3 is a flowchart depicting a secret value estimation method according to an exemplary applied to controlling the security of a cryptographic device using a masked cryptographic secret key to encrypt input data against an implemented side-channel attack. The secret value estimation method is carried out based on a cryptographic primitive previously loaded and run on the analyzed communication device 20, for example by a cryptosystem analyzer. A cryptographic primitive designates a specific cryptographic function or algorithm designed to perform a specific task in the cryptographic system such as authentication, keyed one-way hash function, public or private key cryptography or digital signature.

In step 300, a cryptographic primitive is triggered enabling to run one or more cryptographic mechanism on the cryptosystem under side-channel analysis. A secret key $k \in \{0,1\}n$ may be used to encrypt original data, such as a message or text, referred to commonly hereinafter as 'plaintext' and noted t. The secret key and the original data may be represented by bit vectors composed of n bits. The secret key may be a deterministic variable whereas the original data may be random. Knowledge of the original data t by the cryptosystem analyzer, without any a-priori knowledge on the secret key, is assumed. The secret key may be masked using an unpredictable random mask $m \in \{0,1\}n$ which may be a bit vector comprising n bits. The mask may be internally generated by the communication device 20.

In step 301, the number Q of trace measurements to be collected from the leaked information is determined. The number Q may depend on the signal-to-noise ratio denoted by SNR. In certain embodiments, Q may further be determined according to a target performance measure or metric. For example, in a context of cryptographic secret key recovery, a target performance metric may be a target success rate $SR \in [\![0,1]\!]$ indicating the probability of successful key extraction with respect to one or more side-channel attacks. In one embodiment, the number of trace measurements may be linked to the signal-to-noise ratio SNR and to a target success rate SR by the relation:

$$Q \cong \left\lfloor \frac{2\ln(1-SR)}{SNR \min_{k \neq k^*} \kappa(k, k^*)} \right\rfloor \quad (1)$$

In equation (1), k* denotes the value of the correct key and κ designates a function that may depend on the original text t, the key and a theoretical leakage model Y(t, k). The relationship given in equation (1) may be used for example to set up the number of measurements in the case of symmetric key cryptography using 8-bits secret keys (n=8, a substitution box or S-box to implement algebraic treatment of data ciphering, and a leakage model using a Hamming weight function according to:

$$Y(t,k) = w_H(f(t \oplus k)) \quad (2)$$

In equation (2), f: $F_{2^n} \to F_{2^n}$ designates a bijective function such that f: $x \to x$, $x^{101}$, $x^{254}$ respectively for the case of absence of Sbox, the case of an Sbox with average quality and an AES Sbox (without the affine transformation, which does not affect the confusion coefficient K). In this example, the minimum of the function K corresponding to the three previous cases is given by:

$$\min_{k \neq k^*} \kappa(k, k^*) = 0.125, 0.375, 0.406250.$$

Given the determined number of measurements, Q pairs of traces (x, t) may be acquired in step 303 during the run time of the cryptographic primitive. Data acquisition may be performed through a temporal series of a set of discrete samples, typically within one clock period. For most cryptographic devices, the leakage signal may be represented as a continuous curve. It may be further required, in certain embodiments, that the measurement conditions remain strictly the same, and that the bandwidth of the acquisition tools be large enough such that any two successive acquired traces remain independent and such that the noise altering the measurement environment has the same probability distribution for all measured data.

The signals corresponding to the collected traces are then processed in step 305 to improve the data outcome, highlight signals and/or reduce the noise level.

In step 307, the leakage dimensionality D (D being an integer value and D≥1) is determined. The dimensionality D represents the number of time samples per measurement trace. A measurement series matrix X may be further constructed based on the traces obtained in step 305 and the leakage dimensionality. The value of D may depend on the noise correlation within each trace. The measurements series matrix X may be a D×Q matrix of real entries corresponding to the measurements samples 1≤q≤Q. The $q^{th}$ trace denoted by $X_q$ corresponds to the $q^{th}$ column vector of the measurements series matrix X composed of D random values.

1e;.3qIn step 309, an integer value $S \geq 1$ of the dimensionality of a theoretical leakage model Y is determined. The dimensionality of the leakage model represents the number of leakage model basis vectors that are used to model the set of measured leakage traces. In the context of cryptographic applications, the model Y(t, k) may depend on the cryptographic key k and the known text t. This dependency may be expressed using a function $\varphi$ such that $\varphi: F_{2^n} \times F_{2^n} \to R$ and $Y = \varphi(t, k)$. For example, the Hamming weight function of the XOR operation of the text and the cryptographic key may be used to build the model $(t, k) = \varphi(t, k) \ w_H(t \oplus k)$.

The dimensionality S may depend on the knowledge of the leakage model and on the communication device 20. Linear and affine leakage models refer to leakage models for which the dimensionality S is equal to 1 or 2 (S=1 and S=2).

In embodiments where the communication device 20 is a hardware circuit, the leakage model may be an affine model involving two basis vectors corresponding respectively to a constant and a Hamming distance between the internal variables of the circuit.

In embodiments where the communication device 20 is a processor, the leakage model may be of dimensionality 1+w, where w is the bitwidth of registers (8, 16, 32, 64).

In another embodiment where the hardware cryptographic device is fabricated in an advanced CMOS process, the leakage model may be of dimension 1+w+w(w+1)/2, taking into account the possible influence of the neighboring bits on each other.

Given the determined leakage model dimensionality, the measurement series matrix X can be written as function of a theoretical model matrix $Y \in R^{S \times Q}$ according to:

$$X = \alpha Y + N \quad (3)$$

In equation (3), $N \in RD \times Q$ denotes a noise signal modeling the environment in which the communication device 20 is housed and the matrix $\alpha \in RD \times S$ characterizes the link between the leakage traces and the theoretical model Y. The realizations of the random variables X, Y and N are respectively denoted by x, y and n (not to be confused by the number of bits on the key which is estimated).

The noise distribution is assumed to be known from the cryptosystem analyzer and assumed multivariate independent and identically distributed zero-mean Gaussian of known covariance matrix $\Sigma \in R^{D \times D}$ and probability density function $p_N(n)$ given by:

$$p_N(n) = \frac{1}{\sqrt{(2\pi)^D |\Sigma|}} \exp\left(\frac{-1}{2} n^t \sum\nolimits^{-1} n\right) \quad (4)$$

In equation (4), n is a vector of D real numbers, the superscript $(.)^t$ denotes the transpose operation and $|\Sigma|$ and $\Sigma^{-1}$ denote respectively the determinant and the inverse of the matrix $\Sigma$. The covariance matrix $\Sigma$ is symmetric positive definite admitting decomposition in the form $\Sigma = \Sigma^{1/2} \Sigma^{1/2}$ where the matrix $\Sigma^{1/2}$ is referred to as the standard deviation noise matrix.

In other embodiments of the invention, the noise may be uniformly distributed or modeled by a Laplacian distribution.

According to equation (3), multivariate leakage traces may be seen as linear combinations of basis vectors of multivariate leakage models. Each trace for $1 \leq q \leq Q$ can be written in the form:

$$X_q = \alpha Y_q + N_q \quad (5)$$

In equation (5), $X_q \in R^{D \times 1}$, $Y_q \in R^{S \times 1}$ and $N_q \in R^{D \times 1}$ denote respectively the trace of index q and its corresponding leakage model and noise vectors assumed to be identical for all the traces. Realizations of the random variables $X_q$, $Y_q$ and $N_q$ are respectively denoted by $x_q$, $y_q$ and $n_q$.

Accordingly, for each pair (t, k), in presence of Gaussian noise, the multivariate leakage traces $X_q$, $q=1, \ldots, Q$ given $y_q$ are normally distributed according to the distribution $N(\alpha y_q, \Sigma)$ of probability density function given by:

$$p_{X_q}(x_q | y_q) = \quad (6)$$

$$p_N(x_q - \alpha y_q) = \frac{1}{\sqrt{(2\pi)^D |\Sigma|}} \exp\left(\frac{-1}{2}(x_q - \alpha y_q)^t \sum\nolimits^{-1}(x_q - \alpha y_q)\right)$$

The coefficients of the matrix a may be at least partially unknown by the cryptosystem analyzer. The number of the columns of the matrix a may depend on the complexity of the model.

In an example of a weighted sum of bits leakage model, the model of each trace can be written as:

$$Y_q = \Sigma_{i=b}{}^n \alpha_i Y_i + \beta \quad (7)$$

In equation (7), $Y_i$ denotes the bit of index $1 \leq i \leq n$ in the n-bit sensitive variable Y. Using this model, the dimensionality of the leakage model is equal to S=n+1 and the leakage traces can be modeled in the form of equation (3) where $\alpha = (\alpha_1, \alpha_2, \ldots, \alpha_n, \beta)$ and $$Y = \begin{pmatrix} Y_1 \\ \vdots \\ Y_n \\ 1 \end{pmatrix}.$$

When the leakage model dimensionality is determined to be equal to 1, the model may be a modulation. General modulation models are leakage functions called "pseudo-Boolean" which are functions from n-bits to real numbers. These functions admit a unique decomposition as a Numerical Normal Form that can be represented as $Y = \Sigma_{u \in F_2^n} \alpha_u \delta_u(y)$, where $\delta_u$ is a function which maps a vector of n-bits y to 1 if y=u or to 0 otherwise. Using such leakage models, the dimensionality of the leakage model is equal to $S=2^n$ and the leakage traces can be modeled in the form of equation (3) with:

$$\alpha = (a_{(0\ldots00)_n}, a_{(0\ldots01)_n}, \ldots, a_{(1\ldots11)_n}) \text{ and } Y = \begin{pmatrix} \delta_{(0\ldots00)_n}(Y) \\ \delta_{(0\ldots01)_n}(Y) \\ \vdots \\ \delta_{(1\ldots11)_n}(Y) \end{pmatrix},$$

For all $u \in F_2^n$, $\delta_u(Y)$ denotes the row vector $(\delta_u(Y_1), \ldots, \delta_u(Y_Q))$ composed of Q components.

When the leakage model dimensionality is determined to be equal to 2, the model may be an affine function according to which equation (3) may be expressed as follows:

$$X = \alpha Y + \beta 1 + N \quad (8)$$

In equation (8), $X \in R^{D \times Q}$, $N \in R^{D \times Q}$, $\alpha \in R^D$ and $\beta \in R^D$ represent column vectors, Y and $1=(1, \ldots, 1)$ represent row vectors composed of Q entries. Equation (8) is a particular case of equation (3) for affine leakage models with S=2 where α represents the envelope of the signal and β represents the waveform in absence of signals. In this case, the model Y may be assumed centered with zero mean $E(Y)=0=(0, \ldots, 0)$ and of unit variance such that $Var(Y_q)=E(Y_q^2)=1$ for every $q=1, \ldots, Q$.

In step 311, an estimation k of the secret key may be determined. Given the probability density function of the multivariate leakage traces, an estimation algorithm called "distinguisher" may be implemented in step 311 to calculate estimate(s) of the desired secret value(s) according to the optimization of a performance criterion. In the context of secret key estimation, optimal distinguishers are based on the maximization of the probability of successful key recovery criterion which consists in Maximum A Posteriori optimization. When the different key values are uniformly distributed over $F_2^n$, this criterion reduces to a Maximum Likelihood optimization problem according to which the optimal key estimate $\hat{k}$ is the solution of the optimization problem given by:

$$\hat{k} = \underset{k \in F_2^n}{\operatorname{argmax}} \left( \underset{a \in R^{D \times S}}{\max} (L_k) \right) \tag{9}$$

In equation (9), the function $L_k$ represents a "logarithmic likelihood function".

In embodiments where the secret key is masked using a random mask $m \in F_2^n$ and in presence of multivariate leakage traces and parametric multivariate leakage models of at least partially unknown coefficients, the likelihood function may be expressed as:

$$L_k = \Sigma_{q=1}^Q \log(\Sigma_{m=0}^{2^n-1} P(M=m) p_N(x_q - \alpha y_q)) \tag{10}$$

In equation (10), P(M=m) denotes the probability of observing the mask m. In general, the distribution of the mask is uniform (such implementations are said to be perfectly masked); however, for efficiency reasons, it is possible to encounter non-uniform mask distributions, such as for instance in the low-entropy masking schemes. In particular, the presented likelihood function also apply in the case where masking is deactivated or not implemented, in which case P(M=m) is equal to zero for all values of m but one value. Combining equations (9) and (10), optimal estimation of the secret key under ML criterion may be obtained by solving the optimization problem given by:

$$\hat{k} = \underset{k \in F_2^n}{\operatorname{argmax}} \left( \underset{a \in R^{D \times S}}{\max} \sum_{q=1}^{Q} \log \left( \sum_{m=0}^{2^n-1} P(M=m) p_N(x_q - \alpha y_q) \right) \right) \tag{11}$$

In embodiments where the leakage model is parametric, the logarithmic likelihood function may be composed of statistical models of unknown parameters which are the coefficients of the matrix a. In such embodiments, the optimization problem in equation (11) may be a two-fold optimization problem allowing calculating estimates of the unknown parameters of the leakage model as well as calculating an estimate of the cryptographic secret key.

According to certain embodiments of the invention where the leakage model is parametric, expectation-maximization (EM) techniques may be implemented in step 311 to solve the optimization problem in equation (11). An EM algorithm is an iterative algorithm used in statistics for parameters estimation in statistical models when the random variables involved in the models comprise wholly or partially unknown parameters. Accordingly, given the set of observed values $X_q$ realizations of the random traces $X_q$, $q=1, \ldots, Q$, the set of mask values $m=0, \ldots, 2^n-1$ and the matrix of unknown coefficients α, EM algorithms operate by iteratively alternating between an expectation step and a maximization step until a convergence of the estimated parameters to local maxima. During the expectation step, the EM algorithm evaluates the expected value of the logarithmic likelihood function with respect to the conditional distribution of m given $x_q - \alpha y_q$ under the current estimates of the missing parameters in the matrix a. During the maximization step, the algorithm finds the parameters of the matrix a that maximize the expected logarithmic likelihood function evaluated in the expectation step.

In certain embodiments where the noise is Gaussian and the cryptographic key is not masked, it was shown that the optimal ML distinguisher in equation (9) is equivalent to solving:

$$\hat{k} = \underset{k \in F_2^n}{\operatorname{argmin}} \underset{a \in R^{D \times S}}{\min} \left( tr \left( (x - \alpha y)^t \sum\nolimits^{-1} (x - \alpha y) \right) \right) \tag{12}$$

In equation (12), tr(M) denotes the trace of the square matrix M computed by summing its diagonal terms.

In such embodiments, the parameters of the leakage model composing the matrix a are treated as part of the values to be estimated with the secret key.

The optimization problem of equation (12) may be solved by calculating estimates of the coefficients of the matrix α according to the inner minimization problem of equation (12), and determining an estimate of the value of the secret key by solving the outer maximization problem. According to this two-steps problem solving, the optimal value of a solution of the inner minimization problem of equation (12) may be given by:

$$\alpha_{opt} = (xy^t)(yy^t)^{-1} \tag{13}$$

Accordingly, the corresponding expression of the ML distinguisher in equation (12) may be written as:

$$\hat{k} = \underset{k \in F_2^n}{\operatorname{argmax}} tr \left( y^t (yy^t)^{-1} yx^t \sum\nolimits^{-1} x \right) \tag{14}$$

In a particular embodiment where the noise is Gaussian, the leakage model is affine parametric with S=2 and the leakage traces are multivariate with D≥1, the optimal distinguisher of equation (14) may be expressed by:

$$\hat{k} = \underset{k \in F_2^n}{\arg \max} tr \left( \sum\nolimits^{-1} \frac{C\hat{o}v(x,y) C\hat{o}y(x,y)^t}{V\hat{a}r(y)} \right) = \underset{k \in F_2^n}{\arg \max} \frac{1}{V\hat{a}r(y)} \sum_{d=1}^{D} (C\hat{o}v(x',y))^2 \tag{15}$$

Where $$\hat{Cov}(x, y) = \frac{1}{Q}xy^t - \left(\frac{1}{Q}\sum_{q=1}^{Q}x_q\right)\left(\frac{1}{Q}\sum_{q=1}^{Q}y_q\right)$$

and $x'=\Sigma^{-1/2}x$ results from the processing of the data measurement matrix using the standard deviation noise matrix.

More particularly, if the noise is white, for which the matrix $\Sigma$ is diagonal written in the form $\Sigma=\text{diag}(\sigma_1^2, \sigma_2^2, \ldots, \sigma_D^2)$, equation (15) is equivalent to:

$$\hat{k} = \arg\max_{k \in F_2^n} \sum_{d=1}^{D} \frac{(\hat{Cov}(x_d, y))^2}{\sigma_d^2 \hat{Var}(y)} \quad (16)$$

In another embodiment where the leakage traces are monovariate with D=1 and the leakage model is an affine parametric model, the optimal ML distinguisher of equation (12) may be simplified as follows:

$$\hat{k} = \arg\max_{k \in F_2^n} \left(\frac{\hat{Cov}(x, y)}{\sqrt{\hat{Var}(x)\hat{Var}(y)}}\right)^2 \quad (17)$$

In other embodiments where the leakage model is known by the cryptosystem analyzer, the coefficients of the matrix $\alpha \in \mathbb{R}^{D \times S}$ are perfectly known. The ML optimal distinguisher in the context of non-masked secret key in presence of multivariate leakage model and traces may amount to solving:

$$\hat{k} = \arg\max_{k \in F_2^n} tr\left((x-\alpha y)^t \sum^{-1} (x-\alpha y)\right) \quad (18)$$

In addition, in the case of affine leakage models, equation (18) can be written as:

$$\hat{k} = \arg\max_{k \in F_2^n} \|\tilde{x} - y\|_2^2 \quad (19)$$

In equation (19), $\|v\|$ denotes the Euclidean norm of the vector $v$ and $\tilde{x}$ is the vector of Q traces reduced to one single dimension using the linear projection according to:

$$\tilde{x} = \frac{\alpha^t \sum^{-1}}{\alpha^t \sum^{-1} \alpha}(x - \beta 1) \quad (20)$$

One advantage of such embodiment is that the linear projection step integrated in the ML distinguisher optimizes the signal-to-noise ratio which is greater than any SNR value obtained from monovariate leakage traces considering a same number of leakage traces and a same leakage model.

In response to the estimation of the secret key in step 311, a performance metric PM may be calculated in step 313. In certain embodiments, a security metric such as the success rate evaluating the rate of successful recovery of the secret value(s) may be used. The rate of successful recovery of secret cryptographic keys is associated with a probability of error representing the probability that the estimated secret key is different from the correct key k* according to:

$$Pe=Pr(\hat{k} \neq k^*) \quad (21)$$

In step 315, the estimated secret value and the performance metric PM are output.

In certain advantageous embodiments, a batch processing may be considered for determining the secret value(s) estimate(s). Accordingly, in step 303, the side-channel traces are collected by batches of B traces, with $1 \leq B \leq Q$. When B=Q, the secret value estimation is performed by processing the totality of the collected leakage traces at the same time. When B=1, an estimate of the secret value is determined on a trace-by-trace basis using Q batches, each batch comprising a single trace. Batch processing using B batches of traces with 1<B<Q may interestingly apply for example when batch processing using individual traces requires an intensive computation of success rate graphs, when the transfer of collected traces from the data acquisition unit 232 to the analysis unit 25 is slow, or when a real-time monitoring of the current calculated secret value(s) is required before the processing of all the leakage traces. In such embodiments, batch processing allows advantageously for faster computations and enables parallelization of the secret value(s) estimation steps. For example, the computational complexity required to process success rate graphs may be alleviated using batch processing to determine alternatively success rate graphs for each batch of traces. The transfer of collected traces from the data acquisition unit to the analysis unit may also be accelerated through batch processing by enabling the transfer of groups of traces rather than transferring each trace separately.

In embodiments using batch processing, the logarithmic likelihood function $L_k$ defined in equation (10) involving the summation of the terms $\log(\Sigma_{m=0}^{2^n-1} P(M=m)p_N(x_q-\alpha y_q))$ over all the traces for $q=1, \ldots, Q$ may be computed by summing the partial terms calculated by batch of traces instead of individual traces. Accordingly, the expression of the optimal ML distinguisher in equation (14) rewrites as:

$$\hat{k} = \arg\max_{k \in F_2^n} tr\left(Var(y)^{-1}Cov(x, y)^t \sum^{-1} Cov(x, y)\right) \quad (22)$$

$$= \arg\max_{k \in F_2^n} tr\left(y^t(yy^t)^{-1}yx^t \sum^{-1} x\right) == \arg\max_{k \in F_2^n} tr\left((yy^t)^{-1}(xy^t)^t \sum^{-1} xy^t\right)$$

In equation (22), $yy^t$ (respectively $xy^t$) may be computed in batch as $Var(y)$ (respectively $Cov(x, y)$) with $$Var(y) = \sum_{q=1}^{Q/B} y_{q,B} y_{q,B}^t, \quad Cov(x, y) = \sum_{q=1}^{Q/B} x_{q,B} y_{q,B}^t \cdot x_{q,B}$$

denotes a D×B matrix whose column vectors represent the leakage traces of index q' for $q'=(q-1)B+1, \ldots, qB$ and $y_{q,B}$ denotes a S×B matrix of column vectors representing the leakage model corresponding to the leakage traces comprised in the matrix $X_{q,B}$.

The secret value estimation methods and devices described herein may be implemented by various means. For example, these techniques may be implemented in hardware, software, or a combination thereof. For a hardware implementation, the processing elements of the estimation device can be implemented for example according to a hardware-only configuration (for example, in one or more FPGA, ASIC or VLSI integrated circuits with the corresponding memory) or according to a configuration using both VLSI and DSP.

Figure 4:
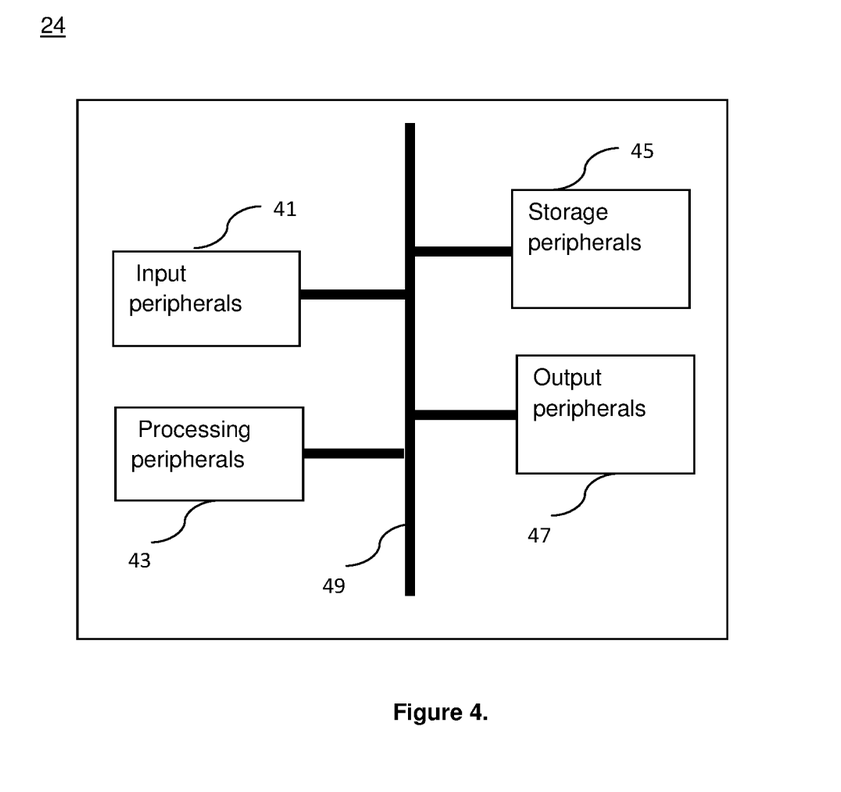
FIG. 4 is exemplary hardware architecture of the secret value estimation device according to certain embodiments of the invention.

FIG. 4 illustrates exemplary hardware architecture of a secret value estimation device 24 according to certain embodiments of the invention. As depicted, the secret value estimation device 24 may comprise computing, storage and communication devices possibly interacting with one another through a data and address link 49 and including:

- Input peripherals 41 for receiving for example input data from the measurement unit 23 or communicating with the cryptosystem analyzer to control the execution of the various instructions according to the various embodiments of the invention;
- Processing peripherals 43 comprising one or more microprocessors (CPU) such as an FPGA or an ASIC configured for example to execute the corresponding instructions to run the methods and algorithms according to the various embodiments of the invention;
- Storage peripherals 45 possibly comprising a random access memory (RAM) or a read-only memory to store for example the measurement series matrix, noise parameters or parameters of the leakage model.
- Output peripherals 47 comprising communication means such as displays enabling for example man-to-machine interaction between the cryptosystem analyzer and the secret value estimation device 24 for example in the form of a graphical user interface.

While certain embodiments of the invention have been described in relation to the determination of a secret cryptographic key used for encryption/decryption of data, it should be noted that the invention it not limited to such application. For example, the invention also applies to a communication device 20 using cryptographic keys in data signature for ensuring the authenticity of a digital document or message used for example in files and software distributions or financial transactions, or in message authentication codes.

Further, the invention is not limited to estimate secret values implemented in communication devices used in communication systems. For example, the invention may also apply to cryptographic systems used for example in data processing systems such as smart cards, multimedia players and recorders or mobile storage devices like memory cards and hard discs, with logon access monitored by cryptographic mechanisms. The secret value estimation methods and devices according to various embodiments of the invention more generally apply to a wide range of communication and data processing applications such as in the car industry to ensure anti-theft protection, in service provider systems to secure access cards, in RFID tags and electronic keys, in mobile phone devices to authenticate the control and access to batteries and accessories, in manufacturing of embedded devices and equipments to provide a protection of hardware and software algorithms against cloning and reverse engineering, in banking industry to secure banking accounts and financial transactions, etc.

Further, the various embodiments of the invention are applicable to estimate secret cryptographic values used in any cryptographic mechanisms implemented in hardware devices such as electronic circuits, any software cryptographic algorithms operating on computer systems or any hybrid systems deploying both hardware and software cryptographic components. Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

The invention claimed is:

1. A device for determining an estimate of at least one secret value used by at least one cryptographic mechanism, from a statistical distribution of a set of multivariate leakage traces,
  - each leakage trace being a vector comprising a plurality of random values,
  - the number of said random values being an integer number greater than or equal to 1,
  - said statistical distribution being a function of parametric linear combinations of a set of leakage model basis vectors representing a multivariate leakage model,
  - the number of said basis vectors being an integer number greater than or equal to 1,
  - said parametric linear combinations being defined by a matrix of real values comprising at least one unknown value,
  - wherein said device is configured to simultaneously determine (i) said estimate of at least one secret value and (ii) an estimate of said at least one unknown value of said matrix of real values defining said parametric linear combinations, using a multivariate estimation algorithm that maximizes a probability of successful secret values recovery and that is an expectation maximization algorithm.

2. The device of claim 1, wherein it comprises an analysis unit configured to determine said set of multivariate leakage traces from at least a leakage dimensionality and a set of acquired side-channel leakage information,
  - wherein said number of said random values comprised in a vector of each leakage trace is equal to said leakage dimensionality.

3. The device of claim 1, wherein it comprises a processing unit configured to determine said statistical distribution of a set of multivariate leakage traces from at least a leakage dimensionality, a leakage model dimensionality, and a leakage model.

4. The device of claim 3, wherein said processing unit is further configured to determine said statistical distribution of a set of multivariate leakage traces depending on a noise of a known covariance matrix.

5. The device of claim 4, wherein said leakage dimensionality of said multivariate leakage traces depends on the noise probability distribution within each leakage trace, and the known covariance matrix is the covariance matrix of said noise distribution.

6. The device of claim 1, wherein said expectation maximization algorithm iteratively alternates between an expectation step and a maximization step, until a convergence of estimated parameters to local maxima.

7. The device of claim 1, wherein said device is further configured to deliver a security performance metric from said estimate of at least one secret value.

8. The device of claim 1, wherein said device is configured to determine the number of said set of multivariate leakage traces depending on the signal to noise ratio (SNR) or/and on a target security performance metric.

9. The device of claim 1, wherein said secret value is a cryptographic secret key used in said at least one cryptographic mechanism to encrypt and/or decrypt data and wherein said cryptographic secret key comprises a set of bits, each bit having a leakage property.

10. The device of claim 9, wherein the leakage properties of the bits are similar.

11. A method of estimating at least one secret value used by at least one cryptographic mechanism from a statistical distribution of a set of multivariate leakage traces, each leakage trace being a vector comprising a plurality of random values, the number of said random values being an integer number greater than or equal to 1, said statistical distribution being a function of parametric linear combinations of a set of leakage model basis vectors representing a multivariate leakage model, the number of said basis vectors being an integer number greater than or equal to 1, said parametric linear combinations being defined by a matrix of real values comprising at least one unknown value, wherein the method comprises simultaneously determining (i) said estimate of at least one secret value and (ii) an estimate of said at least one unknown value of said matrix of real values defining said parametric linear combinations, using a multivariate estimation algorithm that maximizes a probability of successful secret values recovery and that is an expectation maximization algorithm.

12. The method of claim 11, wherein said expectation maximization algorithm iteratively alternates between an expectation step and a maximization step, until a convergence of estimated parameters to local maxima.

* * * * *